INVENTOR:
EDWIN G. STAUDE

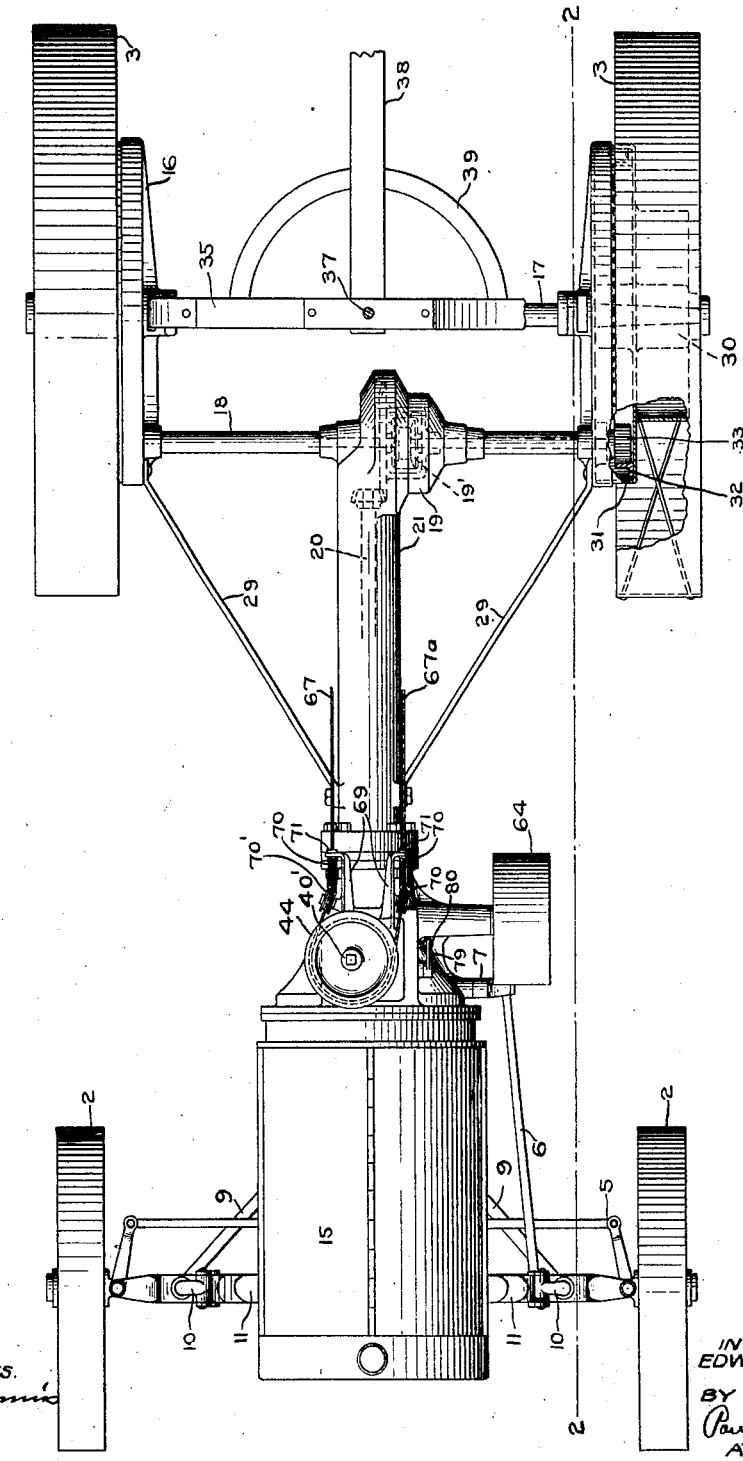

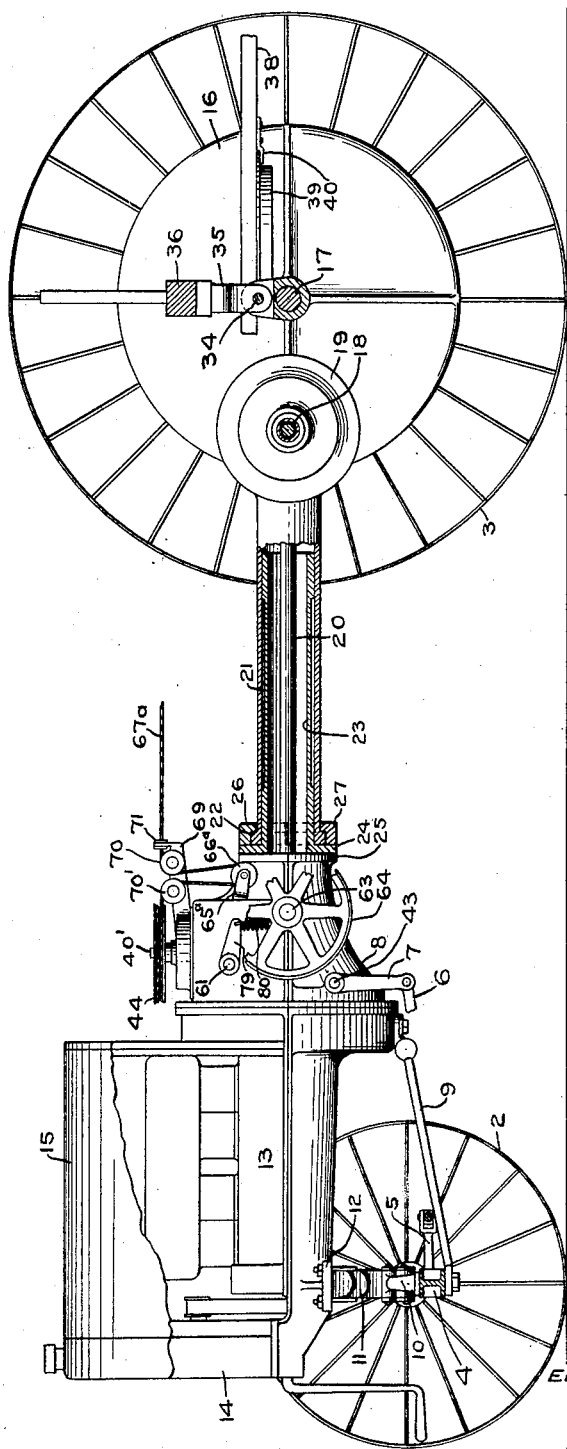

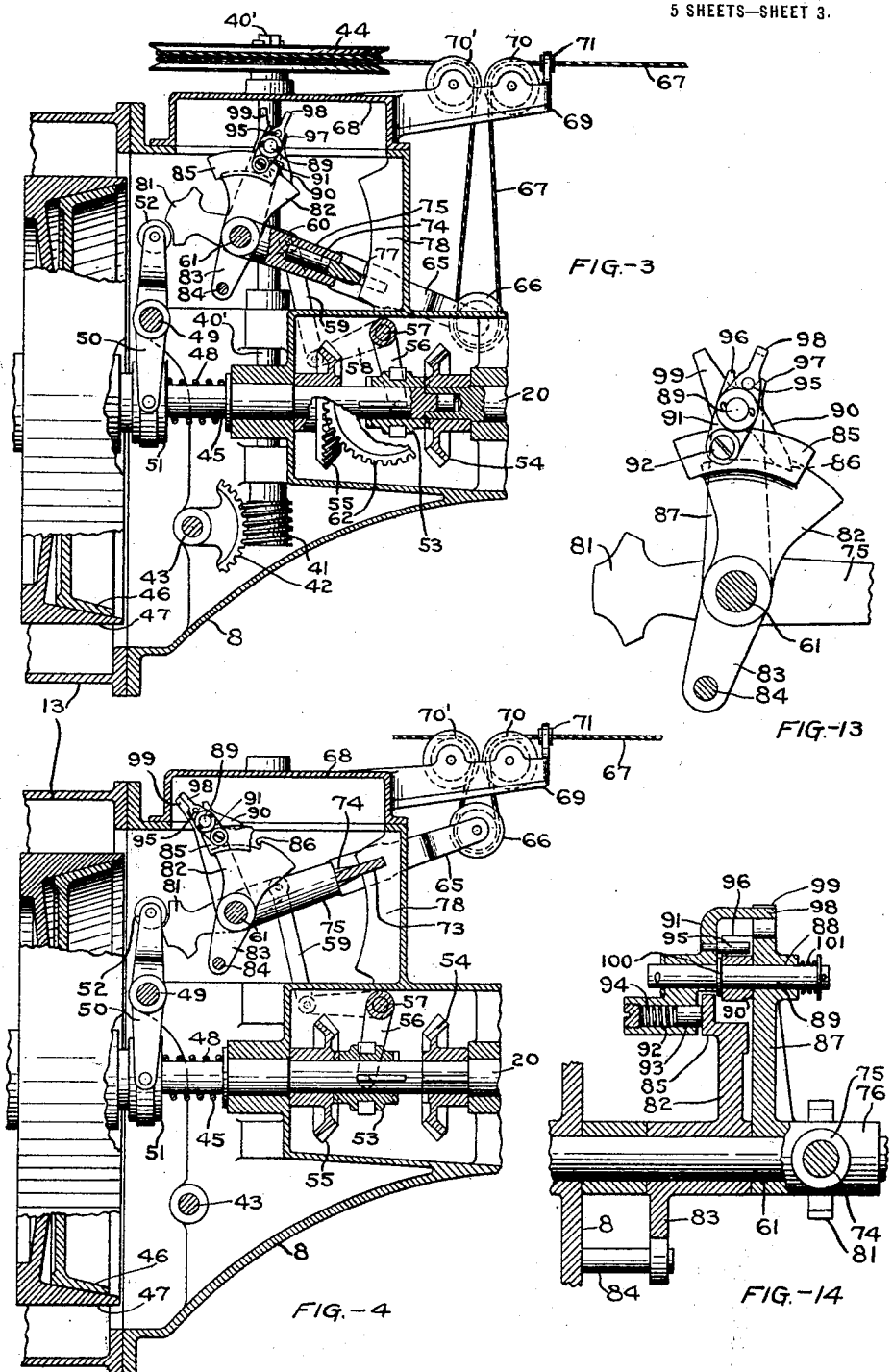

E. G. STAUDE.
TRACTOR.
APPLICATION FILED JULY 10, 1917.

1,389,079.

Patented Aug. 30, 1921.
5 SHEETS—SHEET 5.

WITNESSES:

INVENTOR:
EDWIN G. STAUDE
BY
ATTORNEYS

UNITED STATES PATENT OFFICE.

EDWIN GUSTAVE STAUDE, OF MINNEAPOLIS, MINNESOTA.

TRACTOR.

1,389,079.     Specification of Letters Patent.     Patented Aug. 30, 1921.

Application filed July 10, 1917. Serial No. 179,651.

*To all whom it may concern:*

Be it known that I, EDWIN G. STAUDE, a citizen of the United States, resident of Minneapolis, county of Hennepin, State of Minnesota, have invented certain new and useful Improvements in Tractors, of which the following is a specification.

The object of my invention is to provide a tractor in which the frame of the engine and the housing of the transmission shaft are utilized as a means for connecting the front and rear axles of the machine, thereby eliminating the frame and various parts incidental thereto, usually found in machines of this type.

A further object is to provide a tractor in which the connections between the front and the rear axles will permit either wheel to ride over an obstruction or drop into a depression without racking or twisting its connections with the other wheels of the machine. In other words, either of the rear or forward wheels can rise above or drop below the level of the other wheels without twisting or straining the connections between the forward and rear parts of the machine.

A further object is to provide a machine of comparatively simple construction and one in which a considerable saving is effected in the use of metal.

Other objects of the invention will appear from the following detailed description.

The invention consists generally in various constructions and combinations, all as hereinafter described and particularly pointed out in the claims.

In the accompanying drawings forming part of this specification,

Figure 1 is a plan view of the tractor,

Fig. 2 is a sectional view taken on the line 2—2 of Fig. 1,

Figure 5:
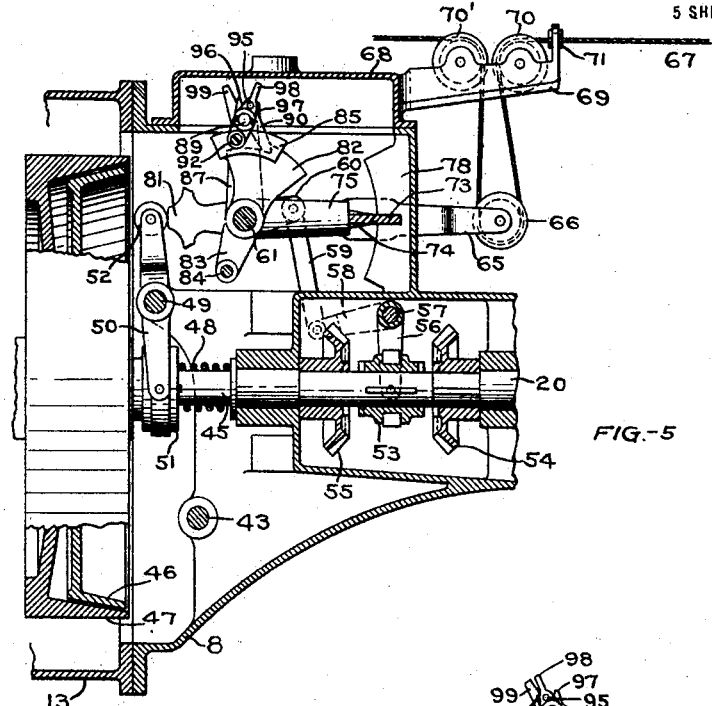
Figure 6:
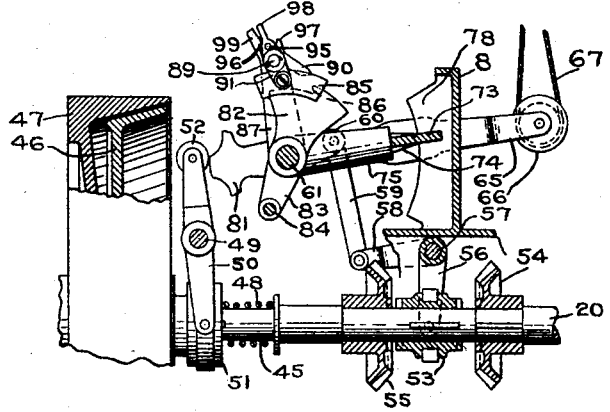
Figure 7:
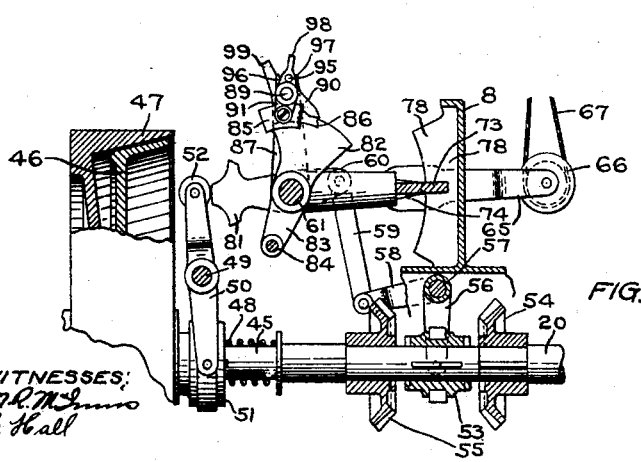
Figure 8:
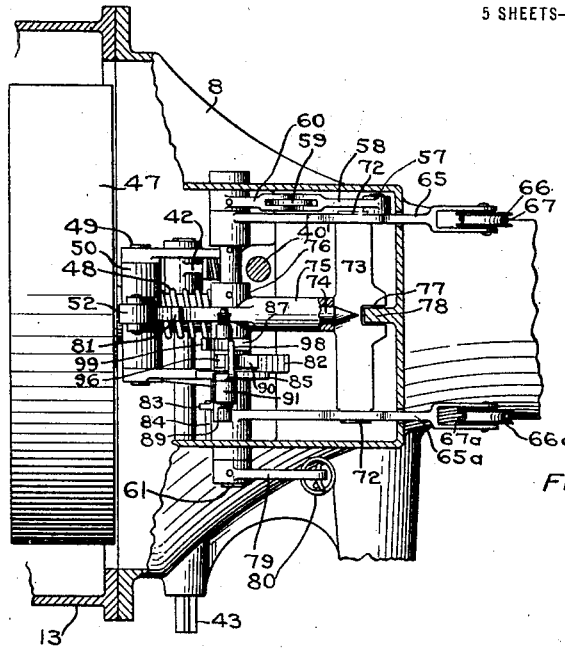
Figure 10:
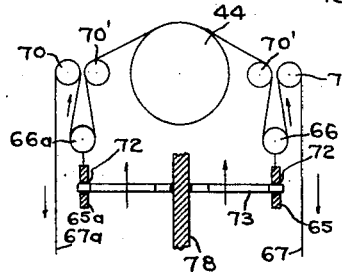
Figure 11:
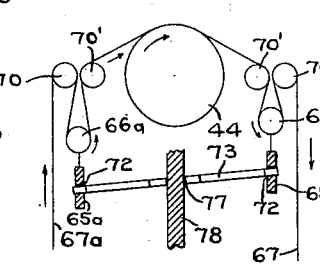
Figure 12:
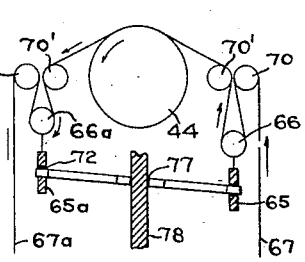
Figure 9:
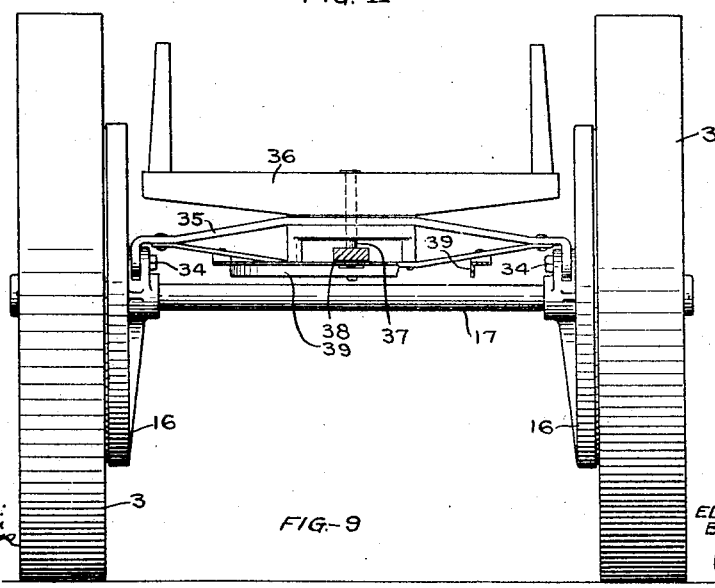

Fig. 3 is a detail sectional view showing the parts in their position when the tractor is being driven forward, Fig. 4 is a similar view, showing parts in position when the machine is being driven backward, Fig. 5 is a similar view with the parts in their neutral position, Fig. 6 shows the same parts in the position they assume prior to being changed from neutral to forward position, Fig. 7 shows the parts still further advanced toward their forward position, Fig. 8 is a plan sectional view of Fig. 7, Fig. 9 shows the bolster connection with the rear axle of the tractor, Figs. 10, 11, and 12 are diagrammatic views, showing the steering mechanism in its different stages, Fig. 13 is a detail view of the locking mechanism, Fig. 14 is a sectional view of the same.

Referring to Fig. 2 of the drawings, 2 and 3 represent the forward and rear wheels of the tractor. The forward wheels are mounted as usual on an axle 4 and have a steering connection 5 connected by a rod 6 to a crank 7 in a gear casing 8 on the engine. This is all of ordinary construction. 9 is a radius rod connecting the forward axle with the engine case and said axle has connections 10 with the spring 11 that is attached to lugs 12 near the forward end of the engine 13. The engine is provided with a radiator 14 and a hood 15 and forms the forward portion of the tractor.

The rear portion of the machine includes the internal drive construction and is composed of drums 16 connected by a shaft or axle 17 fastened thereon. Said drums are connected at their forward ends with housings 18 and 19 wherein is mounted the usual differential gearing 19′, as shown in dotted lines in Fig. 1, and the power is applied thereto through the shaft 20 within a sleeve 21 which forms a part of the casing 19 and runs forwardly to the gear case 8. Said sleeve has a shoulder 22 and within this sleeve is mounted a short sleeve 23 having a flange 24 that is bolted to the flange 25 of the gear case 8. To hold the sleeve 21 on the sleeve 23 I provide half collars 26 and 27 which fit over the shoulder 22 of the sleeve 21 and are fastened to the flange 25. This construction allows a free rotation of the sleeves 21 and 23, and at the same time makes a long, substantial bearing between the front and rear wheels.

The sleeves 21 and 23 form, in effect, a hollow reach connecting the frame or casing of the motor with the rear axle and within this reach the transmission shaft is mounted. The reach forms a substantial connection between the front and rear parts of the machine and by its use I am able to dispense with the frame usually required in machines of this type and thereby economize in the weight of the machine and the cost of the material used. The manner of mounting the reach sections on the motor casing allows vertical oscillation of either the forward or rear axle without distorting or straining any part of the mechanism. This will happen when the machine is moving over rough ground and one wheel rides over an obstruction above the level of another wheel or drops into a depression in the soil. At such time the reach sections will rotate in their bearings on the motor casing and allow the wheel and axle so moved out of its normal horizontal position to adjust itself to such position without affecting the other wheels and axle. I prefer to brace the sleeve 21 on the drum 16 by means of bars 29.

The wheels 3 are provided with hubs 30 having bearings on the ends of the shaft 17 and are also provided with drums 31 partly projecting into the stationary drums 16. Within these drums the brakes of ordinary construction can be applied, although it is unnecessary to illustrate or describe them herein. Within the drums 31 I provide internal racks 32 and pinions 33 engage said racks, and are driven from within the differential case 19.

The above-described construction forms a substantial connection between the front and the rear wheels. Mounted over the rear axle 17 and pivoted at 34 on the drums 16 is a bolster bar 35 and mounted upon said bar is a bolster 36. A king-bolt 37 passes through said bolster and bar and a tongue 38, which projects into the recess of the bolster-bar, has a socket to receive the end of the king-bolt.

To prevent this bolster and the bar from tipping over on its pivot I provide a segment 39 to be engaged by a clip 40 attached to the tongue 38. The other end of this tongue is connected to the rear wheels of a wagon in the ordinary way.

The above describes the general outline of the tractor. I will now describe the steering and operating mechanism.

The machine is of the type known as a "line-drive" tractor and is steered, stopped, started and reversed all by means of two lines. Referring now to Fig. 3, within the gear case 8 is mounted a shaft 40′ having a worm 41 in mesh with a worm gear 42 on a shaft 43 that projects outwardly through the casing and is connected to the lever 7 that has a connection with the rod 6 for steering the front wheels. At the upper end of the shaft 40′ I provide a grooved wheel 44. Within the case 8 I also provide a short shaft 45 and mounted upon said shaft is a clutch member 46 to engage a fly wheel 47 of the engine 13. Normally said clutch is held in engagement with said wheel through the spring 48. To release same I provide a shaft 49 on which is mounted a fork 50 that engages the collar 51 on said clutch, the opposite end of said fork being provided with a roller 52 to be engaged by a cam hereinafter described.

Upon said shaft 45 is splined a collar 53 having teeth at either end to engage gears 54 or 55. To shift said collar into engagement with either one or the other of said gears I provide a fork 56 on a shaft 57 that is provided with an arm 58 and link 59 to a short arm 60 on a shaft 61. I also provide a gear 62 shown in the drawings (Fig. 3) that is in mesh with the gears 54 and 55 and said gear has a shaft 63 (Fig. 2) projecting to the outside of the machine and provided with a drive pulley 64, which may be used for stationary work such as driving a separator or other machinery.

The gear 62 is also used for changing the direction of the gear 54 when the collar 53 is in engagement with the gear 55. The gear 54 is keyed to the shaft 20, which is connected with the differential 19′. To accomplish the shifting of the collar 53 and the clutch 46 by means of the lines I provide loosely mounted arms 65 and 65ª upon the shaft 61, having their ends projecting through suitable slots in the case 8 and provided with sheaves 66 and 66ª to be engaged by lines 67 and 67ª. On the case 8 is a cover 68 to give free access to the interior of the case and upon said cover I provide two projecting brackets 69. Said brackets are provided with sheaves 70 and 70′ which are in such position with respect to each other and the wheel 44 and the sheaves 66 and 66ª that the lines will stay in the grooves of said sheaves. At the ends of the brackets 69 I provide rings 71 through which the lines are inserted to keep the lines and sheaves 70 and 70′ from being disengaged.

It will be noted that if the line 67 is pulled the arm 65 will be raised. I provide the two arms 65 with loose connections at 72 with the bar 73 which is provided with a stud 74 loosely mounted in an arm 75 that has its hub 76 pinned to the shaft 61. I further provide the said bar 73 with a recess 77 to receive a web 78 within the case 8. When the arms 65 and 65ª are raised together the bar 73 will slide along this web 78 (see Fig. 10), but if either arm is operated the bar will grip the web and lock the bar thereon, and increasing the pull on the line will only tighten the grip on the web. This is accomplished by a pull in one direction on the line.

Referring now to Fig. 11, the bar 73 is locked to the web 78 and by continuous pulling on the line 67 the line will travel around the sheave 70 and 66 of the arm 65, thence to sheave 70′ and the wheel 44, and cause said wheel to revolve, the line on the opposite side being free to wind on the wheel, as the other unwinds, thereby causing said wheel 44 through its shaft 40′ to steer the front wheels of the machine.

In Fig. 12 is shown the same operation as described, with the exception that the wheel 44 is being moved in the opposite direction by means of the line 67ª through its sheaves operating upon the lever 65ª, and the line being drawn through the wheel 44 in the opposite direction and the line 67 being paid out. This construction enables the operator to steer the machine and can be carried out regardless of the position of the bar 73 or of the web 78. Normally when the machine is traveling, the lines being loose, the bars 65 and 65ª will be held in a position shown in Fig. 3, by means of an arm 79 mounted on the shaft 61 and the spring 80, normally holding said arm in its downward position (see Fig. 8).

To stop the machine and bring the parts from the position shown in Fig. 3 to that shown in Fig. 5 is accomplished by means of an equal pull on both the lines 67 and 67ª. This will cause the bar 73 to slide freely on the web 78, and allow said bar to be raised horizontally, as shown in Fig. 5. Whenever the bar 73 is free to move or when the lines are being pulled together, then the wheel 44 is stationary and does not move, the line being temporarily anchored at that point. When the arms 65 and 65ª are moved to their horizontal position, the bar 73 will rock the arm 75 and the shaft 61, thereby disengaging the collar 53 from the gear 54 through the arm 60 previously described.

To disengage the clutch 46 I provide a cam 81 mounted on a hub 76 of the arm 75. When said cam comes into engagement with the roller 52 on the fork 50 it will disengage the clutch and the machine will stand still, while the lines are being held taut. By continuous pulling on both of the lines the parts will be brought to the position shown in Fig. 4 and the machine reversed. The clutch 46 will be in engagement with the fly wheel and the collar 53 will be in engagement with the gear 55 and through the gear 62 the gear 54 will be revolved in the opposite direction. The gear 55 is loosely mounted on the shaft and is used for reversing purposes and to drive the pulley 64 when the machine is stationary.

Now, the parts thus far described show mechanism in the different positions while fully controlled by the man at the lines. To lock said mechanism in neutral position, like that shown in Fig. 5, I provide automatic means to lock same in that position, and I shall describe the same.

Referring to Figs. 13 and 14, 82 is a segment loosely mounted on the shaft 61 and having an arm 83 connected by a pin 84 to the case 8. This will hold the segment 82 in a rigid position. Upon said segment and to one side thereof I provide a plate 85. I also provide a tooth 86. The hub 75 is also provided with an upwardly projecting arm 87 having a bearing 88 for a pin 89 that carries a pawl 90 (Figs. 13 and 14) said pawl being in position to engage the tooth 86 and lock the arm 87 and the shaft 61 with the arm 75, the bar 73 and the arms 65 and 65ª in a horizontal position (see Fig. 5), the clutch being thrown out and the machine standing still while the parts are so held.

To disengage the pawl from the tooth 86 and allow the parts to take the position shown in Fig. 3, the operator pulls equally on both lines and through the mechanism rocks the shaft 61 until the parts assume the position shown in Fig. 6. In other words, the operator pulls on the lines as he would in reversing the machine, but does not pull back sufficiently to set the clutches for the reverse. This movement will cause the arm 91 to be rocked on its pivot on the pin 89. The arm 91 has a socket 92 for a friction pin 93, held in engagement with the plate 85 by a spring 94. There will be sufficient friction when the pin 93 comes in contact with the plate 85 to hold this arm 91 stationary while the pivot pin 89 moves past it. The pin 95 on said arm will come in contact with a projection 96 on the pawl 90 and will raise said pawl out of engagement with the tooth (see Fig. 6).

By allowing slack on the lines the shaft 61 will be rocked and the arm 87 will carry the pawl forward up to a point just beyond the tooth 86. In the meantime, the friction of the pin 93 on the plate 85 causes the arm 91 to oscillate and the pin 95 to come in engagement with the lug 97 of the pawl 90. This will have a tendency to push the pawl down upon the periphery of the segment 82, and the pawl will slide over the segment until the parts again reach the position shown in Fig. 3. To prevent lifting of the pawl 90 higher than necessary the arm 91 has a bent portion 98 that engages a stop 99 on the arm 87 (see Fig. 4). When the shaft 61 is reversed, the friction block 93 will be held stationary temporarily while the pin 89 travels past it. The pin 95 engaging the lug 97 will push the pawl 90 down onto the segment 82 until it strikes the tooth 86 and further movement of the shaft will be stopped and the parts will be in their neutral position.

The pawl 90 is engaged by a shoulder 100 on the pin 90 and a spring 101 has sufficient tension to hold said pawl either in its upward or downward position until the pin 95 comes into contact with either one of its lugs 96 or 97. The space between said lugs is sufficient to cause said pawl to be pushed down in the path of the tooth 86 when the arm 87 is pulled back a sufficient distance, or all the way back, but if said arm is moved back partially, as shown in Fig. 6, the pawl 90 cannot drop down in front of the teeth 86, but will ride over it. From the foregoing description it will be understood that the machine is of simple construction and positive and reliable in its action.

I claim as my invention:

1. The combination, with a rear axle and power driven traction wheels therefor, supports mounted on said axle, a bolster supporter hinged on said supports, and extending substantially parallel to said axle, for receiving a bolster, a king-bolt for pivotally securing said bolster to said bolster supporter and providing a draft connection for the reach or pole of a trailer.

2. The combination, with a rear axle and power driven traction wheels therefor, supports mounted on said axle, a bolster supporter hinged on said supports, a hole in said bolster supporter for receiving a king-bolt for pivotally securing a bolster, and means on said bolster supporter for securing the reach or pole of a trailer.

3. The combination, with a rear axle and power driven traction wheels, supports mounted on said axle, a bolster supporting means hinged on said axle supports, a hole in said bolster supporter adapted to receive a king-bolt for pivotally securing a bolster thereto, means on said bolster supporter for pivotally securing a reach or pole and a hound 39 secured to said bolster supporter and having a sliding connection with said reach or pole and adapted to hold the bolster supporter in position.

4. The combination, with the rear axle and traction wheels, of gears secured to said wheels, drums encircling said gears and having hubs on said axle, a bolster bar having its ends pivotally connected with said hubs and provided with a recess to receive a draft connection, and a king-bolt passing through said bar and said recess.

5. The combination, with a rear axle and traction wheels therefor, of gears for said wheels and drums mounted on said axle and encircling said gears, a bolster bar having downwardly turned ends pivotally connected with said drums, the pivots of said bar being parallel substantially with said rear axle, a bolster mounted on said bar, a draft connection, and a king-bolt passing through said bolster, said draft connection and said bar.

In witness whereof, I have hereunto set my hand this 5th day of July. 1917.

EDWIN GUSTAVE STAUDE.